United States Patent [19]

Ray

[11] 4,075,847

[45] Feb. 28, 1978

[54] DIRECT CONVERSION OF SOLAR ENERGY TO MECHANICAL ENERGY

[76] Inventor: Edward D. Ray, 2615 NW. 46th Place, Lawton, Okla. 73505

[21] Appl. No.: 684,298

[22] Filed: May 7, 1976

[51] Int. Cl.² ............................................. F03G 7/06
[52] U.S. Cl. ..................................... 60/527; 60/641
[58] Field of Search .................. 60/527, 528, 529, 641

[56] References Cited

U.S. PATENT DOCUMENTS

| | | | |
|---|---|---|---|
| 3,830,060 | 8/1974 | Jedlicka et al. | 60/527 |
| 3,968,692 | 7/1976 | Blättler et al. | 60/527 |

Primary Examiner—Allen M. Ostrager
Assistant Examiner—Stephen F. Husar
Attorney, Agent, or Firm—David O'Reilly

[57] ABSTRACT

Disclosed is a method and means for direct conversion of solar energy to mechanical energy through alternate warming and cooling of material consisting of highly aligned, high density polymer molecules. A strip of said material, when warmed by any means, contracts along its axis of alignment and such contraction can do mechanical work in a way mechanically similar to muscular contraction. A plurality of such strips mounted upon a rotor does work against gravity; the gravity field then returns the energy as torque.

10 Claims, 7 Drawing Figures

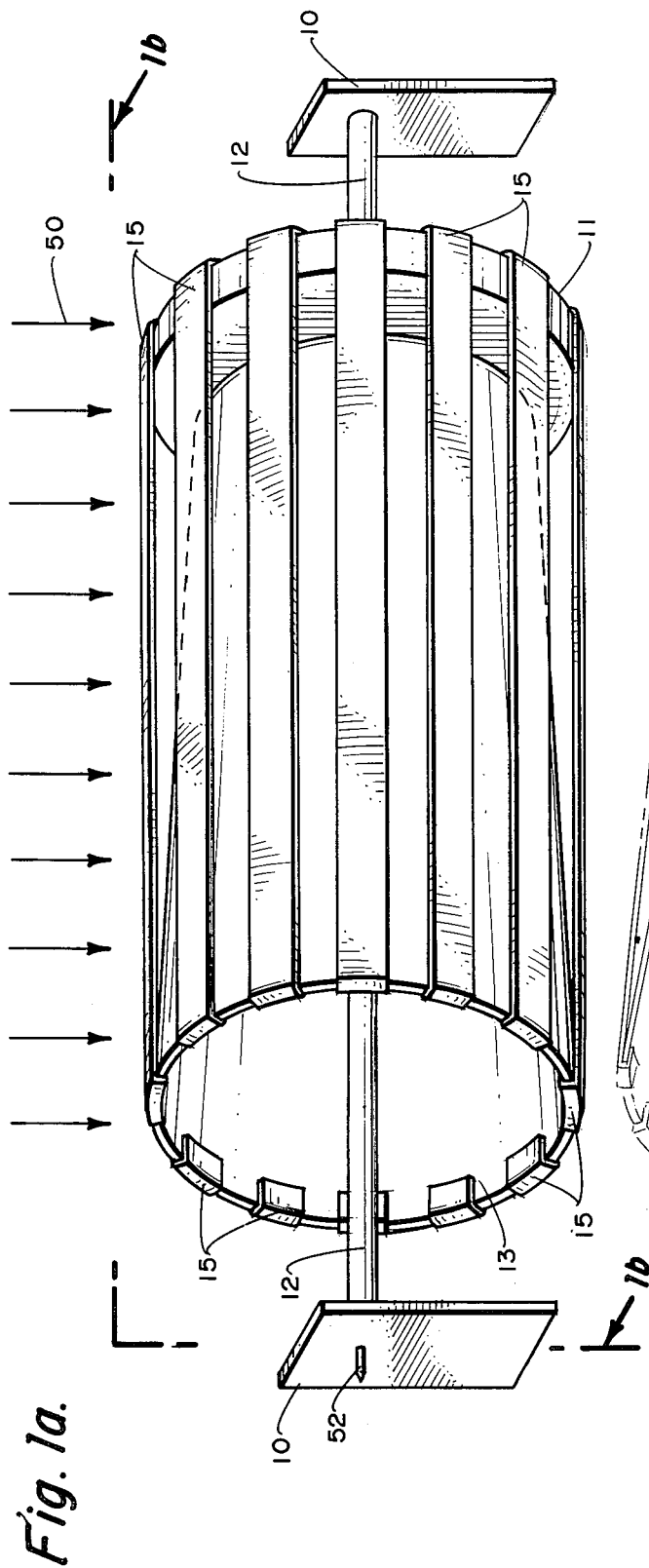
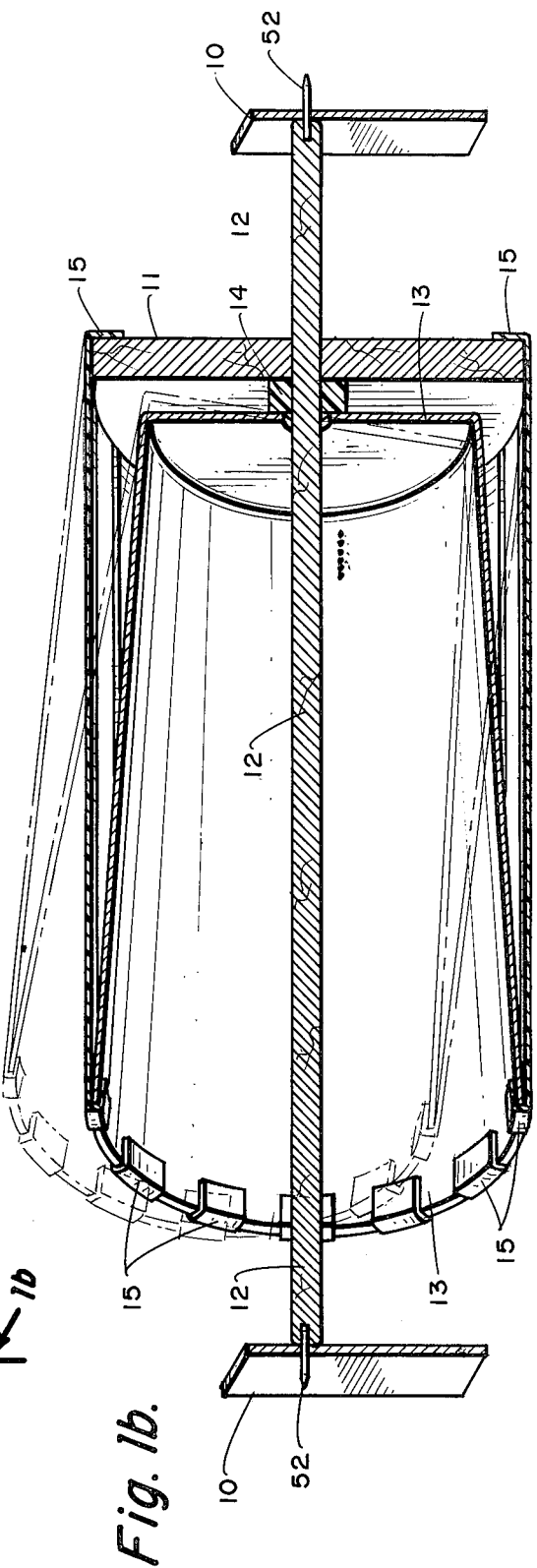
Fig. 1a.
Fig. 1b.

DIRECT CONVERSION OF SOLAR ENERGY TO MECHANICAL ENERGY

The ingenuity of America is focused upon the need for clean, cheap, abundant and utilizable energy. Solar energy embodies the first three of these properties, but the fourth property as yet largely fails solar energy. If solar energy were readily convertable to mechanical form, the property of utilizability would be at hand. The arts of converting mechanical energy to other forms of energy or of the direct utilization of mechanical energy are advanced.

Schemes for converting solar energy to mechanical energy have necessarily involved complexity in collecting and tracking solar radiation and complexity in the use of working fluids to accomplish conversion. That complexity raises costs and dissipates efficiency.

Polymer molecules are long chains of a basic molecule. These chains can be visualized as long strings subject to the laws of thermodynamics and the kinetic theory of heat. Polymer molecules are, however, unique subjects of these laws and that theory in that no other molecular arrangement provides an additional and readily variable degree of freedom of motion, namely, lateral vibration with respect to molecular endpoints. This unique property of extreme length provides the means to easily observe macroscopic motion due to microscopic motion. Brownian Motion and thermal expansion are examples of the observance of the connection between micro- and macro-motion.

Consider an inelastic string whose endpoints are constrained, but whose middle is free to vibrate laterally. Without vibration, the string has a fixed, well-defined length. With lateral vibration in any variety of modes, the average distance between the endpoints decreases. Appropriately configured polymer molecules behave in an analogous way.

An amorphorous mass of polymer will normally have its constituent molecules arranged in a random way, not unlike a bowl of spaghetti. Such a polymer mass can have its molecules alligned to various degrees along a single axis by extrusion, cold drawing and other methods of elongation. In such unaligned material, all monomer points on the molecular chains are largely free to respond as individual molecules, hence such unalligned material responds in the usual way upon heating, namely, the material undergoes thermal expansion in all directions. If, however, a strip of material having its polymer molecules aligned along one axis is heated, then the reverse effect discussed above dominates. The strip draws up in a manner mechanically similar to muscular contraction. Conversely, upon cooling, the strip relaxes.

Not all polymer molecules exhibit the contraction response upon heating. Asymmetric constituent submolecules, polymer branching and cross-linking can inhibit the contraction effect. Ideally, the polymer molecule should have the following properties to maximize its ability to convert heat energy to mechanical energy:

1. High molecular density, i.e., the longer the polymer chain the greater the freedom of lateral motion and, hence, the mutual approach of endpoints.

2. Polymer branching and/or cross-linking should occur near the molecular endpoints but not throughout the molecule's middle. This accomplishes a splicing effect and simulates higher density. Endpoint branching and/or cross-linking also establishes high tensile strength of the constituted material which provides for greater contracting force and more available mechanical work.

3. The structure of the constituent monomer molecules of the polymer should be symmetrical. This provides for an inelastic molecular string, whereas asymmetrical monomers may allow bending of molecular bonds and result in elasticity of the chain. Inelasticity readily transfers contricting forces directly to the chain molecules end points.

Polyethelene is a polymer which can approach the above ideal. Commercially available film polyethelene resin blends can be processed by cold stretching to provide strips which can be mounted according to the present invention and will do useful work in the conversion of solar to mechanical energy.

When a strip of previously cold drawn polyethelene film is stretched from a relaxed state a noticeable rise is temperature occurs in the strip. The warmth can be felt by stretching the strip as it is in contact with one's lip. The rise in temperature can be explained as a reduction in the capacity of the degrees of freedom peculiar to the ideal polymer described above. When a polymer string is stretched, its frequency of vibration increases such that its vibrational energy is transferred to other available molecular degrees of freedom, resulting in a rise in temperature. Conversely, when the warm strip returns to the ambient temperature while under stress, the released strip cools below ambient temperature as heat is allowed to return to the string-vibrational degree of freedom. This effect can be used as a heat pump. With an appropriate mounting of a strip, absorption of heat from solar radiation can be enhanced as the strip contracts and cooling can be enhanced as the strip relaxes. This heat pump effect allows the strip to do its work across a low temperature differential. In turn, the heat pump effect diminishes the necessity to concentrate solar radiation to utilize it.

Commercially available film polyethelene can be processed as follows to render it functional as a solar collector and working material. The film polyethelene should be pigmented with a black, radiation-absorbing substance and the film should remain opaque after cold stretching (which diminishes the film's thickness). The black pigment should also retard molecular cross-linking due to solar ultraviolet radiation and help preserve the polymer under extended sunshine exposure. The stretched polyethelene surface should be rendered as close as possible to approach a black body surface by texturing and coating. Efficiency of energy conversion is directly dependent upon how rapidly energy is both absorbed and re-radiated (or otherwise lost) from the working strip's surface. The stretched polyethelene should be thin enough to minimize time lost in internal conduction of heat while remaining thick enough to remain high in tensile strength and opaqueness. The film polyethelene is cold stretched in strips to a length just short of its break point. The stretching accomplishes the alignment of the molecular chains within said strips along the direction of stretch and high tensile strength results along the stretch axis. No coating or texturing of the stretched film's surface was necessary to achieve working models. Extreme simplicity and low cost were objectives in the model constructions. Obvious enhancements of efficiency accomplished by coating, texturing, admixturing of pigments and molecular redesign of the polyethelene must be cost effective.

It is an object of the present invention to provide a means, method and apparatus which accomplishes solar radiation energy collection, tracking and conversion to usable mechanical energy in a simple, inexpensive way, involving substantially only one moving part — the solar motor itself.

Another object of this invention is to utilize the available mechanical energy from a strip of highly molecularly aligned, high density polymer material as it contracts and relaxes upon warming and cooling, such warming and cooling being accomplished by any convenient means including insertion in and withdrawal from solar radiation.

A further object of this invention is to establish mechanical configurations upon which a plurality of said strips can operate in a concerted fashion to concentrate their collected solar energy upon a single axle.

A further object of this invention is to establish mechanical configurations upon which incident solar radiation will convert to mechanical energy through a broad enough range of angles to alleviate the problem of tracking the sun.

A still further object of this invention is to establish a source of power originated by the warming and/or cooling of said strips to operate non-rotary devices such as venetian blinds, heat sensitive instruments, solar trackers, and the like.

These objectives and other advantages and objectives will become clear from the following detailed descriptions and drawings wherein:

FIGS. 1a and 1b are drawings displaying a cylindrical embodiment of the invention.

Figure 4A:
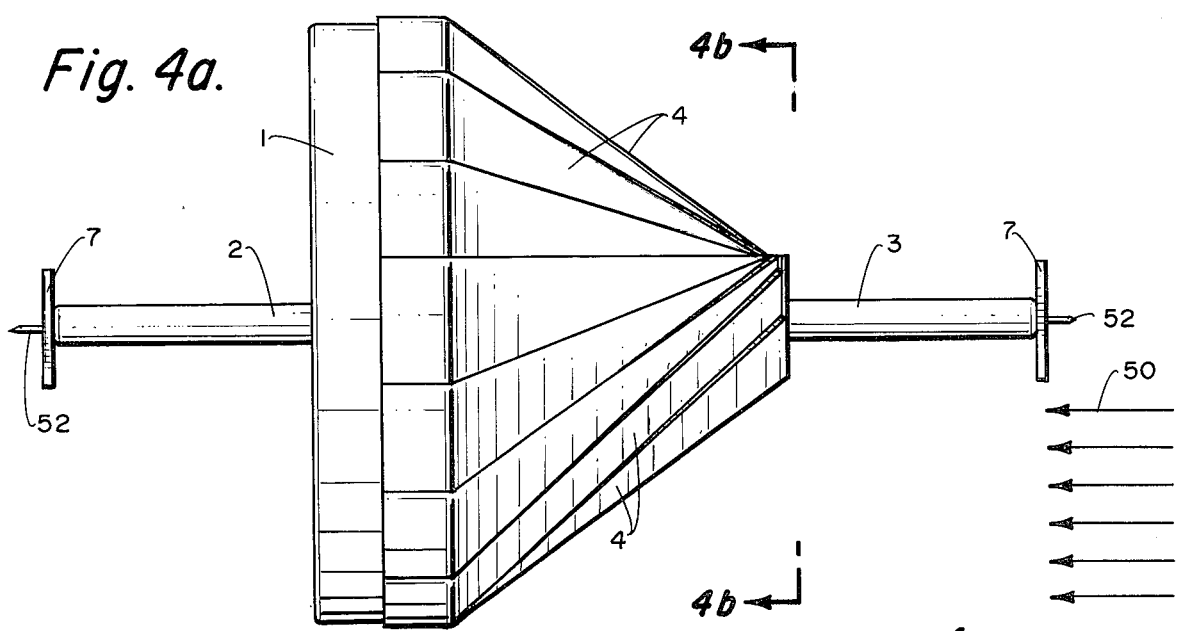
Figure 4B:
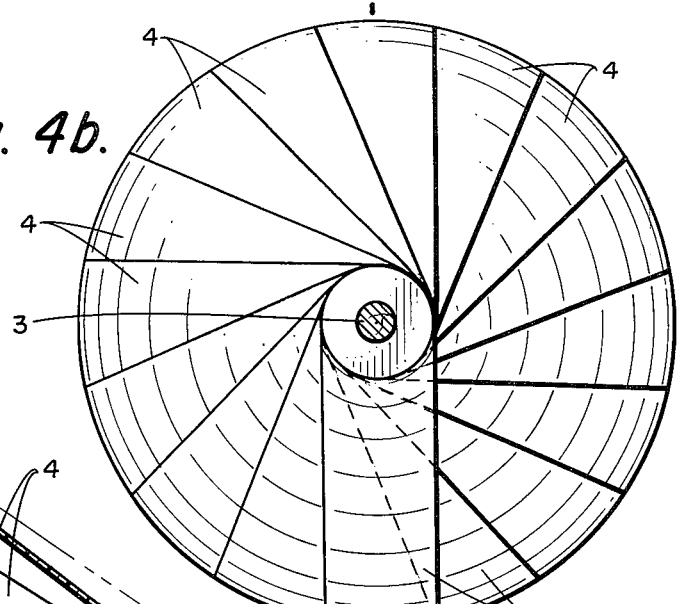
Figure 4C:
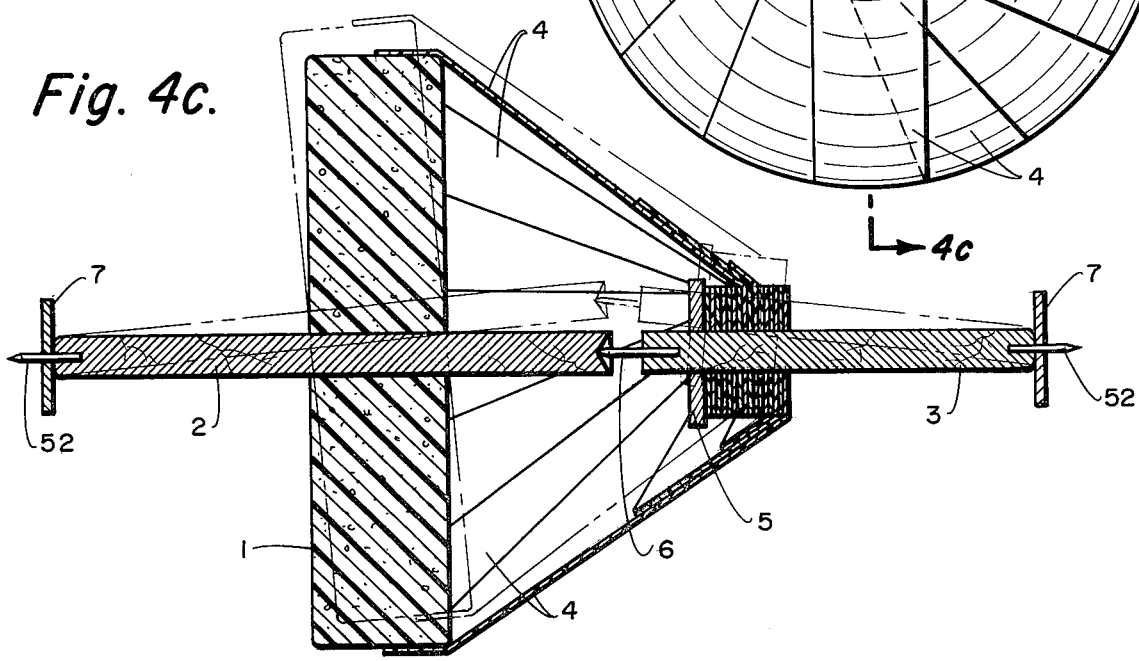

FIGS. 4a, 4b, and 4c are drawings of a disk-shaped embodiment of the invention. Whenever like numbers occur in different figures, such numbers will refer to similar elements of the figures.

Referring now to the drawings, particularly to FIG. 1 consisting of FIGS. 1a, and 1b, there is illustrated a rotor free to turn with metal pins 52 upon bearings 10. Incident radiation is indicated by arrows at 50. A disk 11 is fixed concentrically to axle 12. A cup 13 with a hole in the center of its bottom is slipped over the axle and against a pivotal washer 14. Such washer separates cup 13 from disk 11 by a sufficient distance to allow cup 13 to wobble about axle 12 unimpeded at the cup's bottom by disk 11. Strips 15 of drawn polyethelene are attached around the open rim of cup 13 and around the circumference of disk 11. In FIG. 1 strips are omitted alternately from the drawing to allow a better view beneath them. No such strips are omitted in the actual embodiment. In attaching strips 15, stretch may be applied such that cup 13 is centered about axle 12 while all strips 15 are held at constant temperature. Alternately, cup 13 may be held centered about axle 12 while strips 15 are attached loosely but without slack. The strips can then be warmed evenly and said strips will tighten evenly on their own accord. The specific materials used in the FIG. 1 construction are: bearings 10, metal pins 52 resting upon polyvynlchloride; disk 11, wood; axle 12, wooden dowling; cup 13, rigid plastic; pivotal washer 14, hard rubber; strips 15, as described above. A wide variety of substitutions for all these materials is obvious, except in the case of strips 15. When the device of FIG. 1 is warmed by radiation from above the upper strips contract and the open end of cup 13 is raised as shown by the phantom lines of FIG. 1b. Upon such raising, additional stretch is applied to the lower strips which causing a rise in temperature as discussed above enhancing their loss of heat. The rotor is now top heavy and it begins to fall around. The rotor is self starting and it begins to turn top over towards the source of incident radiation 50 which is rarely exactly vertical. The rotor will, however, run in an opposite direction if started oppositely. While the strips are on the underside they are out of the warming radiation and said strips lose heat by conduction, convection and radiation. As the warmed upper strips turn out of the incident radiation they lose heat and relax thereby allowing the approaching upper contracting strips to lift the open rim of the cup. This cycle is repeated as the rotor turns. If a load is applied to the rotor's axle, then rotation is slowed. This allows more time for the incident radiation to be absorbed and for the lower strips to cool. The open end of the cup rises higher and the rotor responds to an applied load with increased torque.

From the following description, it will be appreciated that several of the objects of the present invention are accomplished.

Radiation energy is collected by the strips as they pass under the incident radiation. Further collection and concentration of converted solar radiation can be accomplished by increasing the diameter of the rotor, by increasing the length of a single rotor-cup element, and by the mounting of several rotor-cup elements upon a single axle, thereby concentrating collected radiant energy for mechanical output from said single axle.

Since the motor displayed in FIG. 1 is responsive to incident radiation from all angles not greater than about sixty degrees from the vertical, said motor operates without solar tracking.

The polyethelene strips accomplish conversion of solar energy to usable mechanical energy. No working fluids are involved. The entire device is notably lacking in complexity since the device itself is substantially its own only moving part. Parts and materials are inexpensive and readily available.

Figure 2:
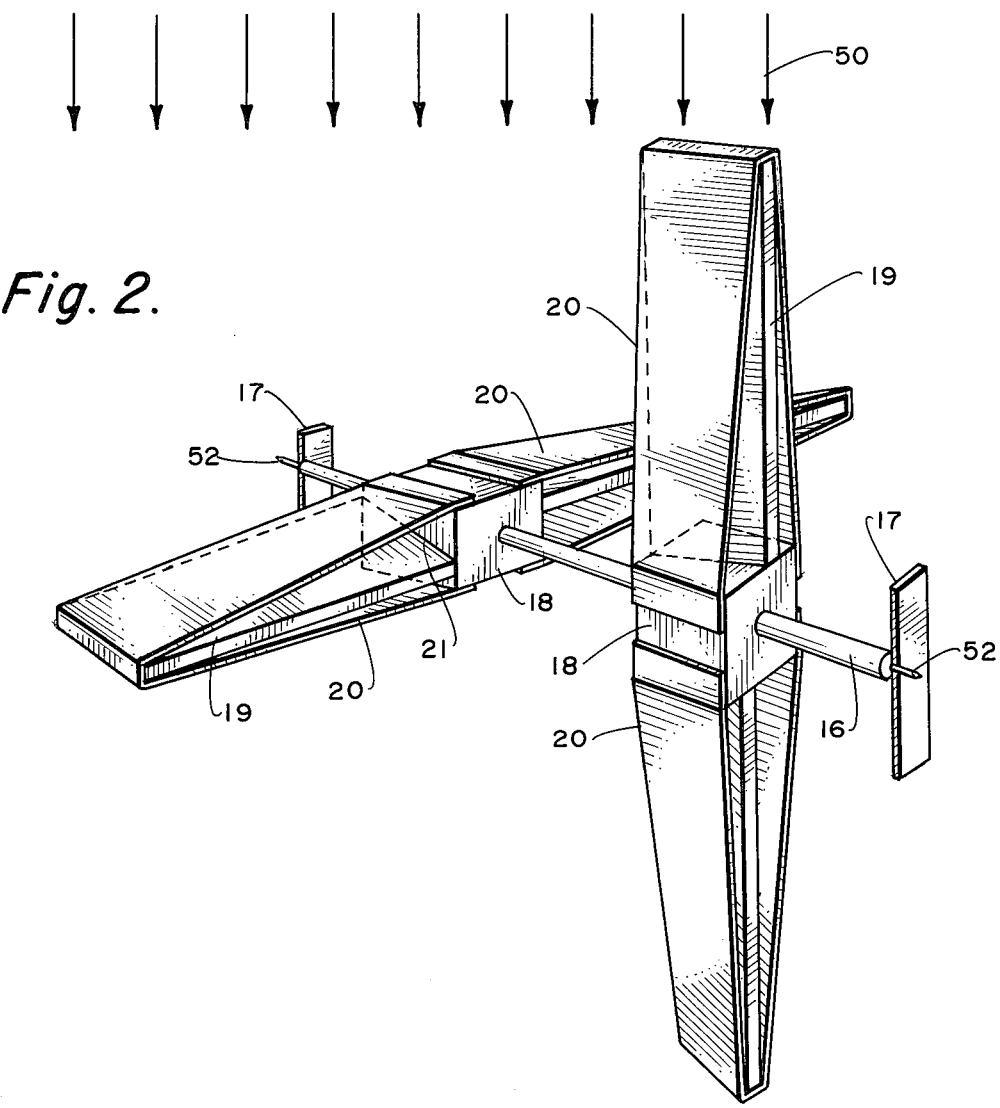
FIG. 2 is a drawing of a bladed embodiment of the invention.

Reference is now made to FIG. 2, which is a second embodiment of the invention. Axle 16 is free to turn upon bearings 17. Mounting cubes 18 are affixed to axle 16. Working arms are constructed from blades 19 held in place by cold drawn polyethelene strips 20. Said strips are attached to mounting cubes 18 and the outer tips of blades 19. Said strips are taught enough to hold blades 19 perpendicular to the faces of the mounting cubes 18 upon which the inner ends of blades 19 bear. Tightening of the strips may be accomplished by the alternate self-adjusting method discussed with FIG. 1. At the bearing lines 21 where blades 19 rest upon mounting cubes 18, blades 19 are free to angle either way from perpendicularity to the supporting face of cubes 18. Blades 19 are angled about 20° from the axle axis in order to render the working arms capable of propelling air when the assembled device rotates. The specific materials used in the FIG. 2 construction are: axle 16, wooden dowling; bearings 17, metal pins 52 resting upon polyvynlchloride; mounting cubes 18, wood; blades 19, rigid plastic; strips 20, as described above. Again, a wide variety of substitutions for all these materials is obvious, except in the case of strips 20. The apparatus of FIG. 2 operates by the blade 19 angling upward (i.e. towards a V-shape) from the contraction of plastic strips 20. This causes an imbalance causing the horizontal portion to fall around as the raised center of gravity seeks a lower position and the vertical portion to turn to the horizontal (i.e. a 90° rotation of axle 16). When the solar heat is not directly irradiating the plastic strips, they cool and relax, while the upper horizontal strips are being heated, causing them to contract to continue the rotation. Cooling could be enhanced by having the lower end of the vertical portion dip in a coolant such as water, etc.

The warming and cooling cycle of the working polyethelene strips operate in the same manner as was described for the strip's operation in FIG. 1. The blades 19 rise and then fall around the axle in a manner analogous to the rising and turning of cup 13 of FIG. 1. In the embodiment of FIG. 2 the working arms function to collect solar radiation, convert the radiation to mechanical energy and also propel surrounding air toward one end of the axis of axle 16. As an example of the utility of the invention as embodied in FIG. 2, the device was mounted atop a toy boat and the substantially single moving part propelled the boat through the water solely under the power of incident radiation 50.

Figure 3:
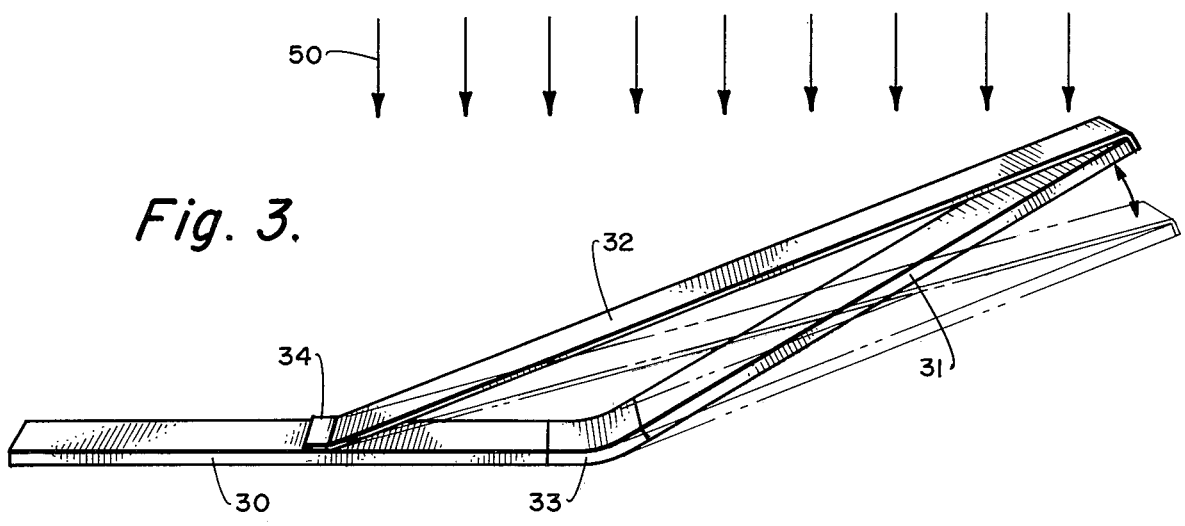
FIG. 3 is a drawing of a bending arm embodiment of the invention.

Turning now to FIG. 3, an extremely simple bending arm embodiment of the invention is shown. Lower arm 30 is attached to upper arm 31 under strip 32 at an elbow 33. Elbow 33 is constructed of an elastic material so that it affords a straightening force as the elbow is bent. Working polyethelene strips, as discussed above, are stacked upon one another to form a material which functions in a manner mechanically similar to muscle function. Such stacked material will be called the "muscle element" 32. The muscle element is attached to lower arm 30 and upper arm 31 as shown in FIG. 3. The strength of muscle element 32 can readily be varied according to strength required by varying its thickness and width. The angular range, through which lower arm 30 can move due to a given working temperature variation, can readily be varied by varying the distance between the attachment point 34 of muscle element 32 to the lower arm 30 and the elbow 33. Lower arm 30 and upper arm 31 can be constructed of any convenient rigid material. Whenever solar energy of any other warming influence raises the temperature of muscle element 32, lower arm 30 raises and will do whatever work within its power. The phantom lines of FIG. 3 illustrate movement upon warming. Obviously, such work need not be upward. Since the muscle element 32 behaves upon warming in a way mechanically similar to animal muscle, the embodiment of FIG. 3 uses the favorite muscular embodiment of nature. The device of FIG. 3 could be used as a prime mover of a wide variety of devices such as radiation, heat and temperature measuring instruments, solar tracking devices, automatic venetian blind activation, and the like. Substantially the same device as at FIG. 3, when compounded, could constitute artificial limbs if muscle element 32 were warmed and cooled by embedded electrical elements. Similarly, since polyethelene is biologically inert, muscle element 32 could be adapted as artificial muscle, with living bone serving as lower arm 30 and upper arm 31.

Referring now to FIG. 4 consisting of FIGS. 4a, 4b, and 4c, a disk 1 is firmly mounted upon axle part 2 such that one end of axle part 2 provides a pivot upon which one end of axle part 3 can wobble freely. The mating ends of the two axle parts come together such that wobble can occur without lateral sliding of the ends as they mate. Working strips 4 of cold drawn polyethelene are reinforced with glue-attached cardboard at their center and a hole is punched, equal in diameter to axle part 3, through the cardboard/polyethelene center. A plurality of such reinforced working strips 4 is slipped over axle part 3 to rest upon support disk 5 such that support disk 5 comes between the stack of working strips 4 and pivot extension 6. Working strips 4 are attached radially by their ends as shown in FIG. 4 to the outer rim of disk 1 so that axle part 2 and axle part 3 are aligned along a straight axis. Outer ends of axle part 2 and axle part 3 have metal pins 52 inserted perpendicular and centered to rest upon a bearing surface 7 of polyvinylchloride or other low friction bearing.

When the lower working strips 4 are warmed by incident radiation, said strips contact causing axle part 2 and axle part 3 to angle upward, as shown in phantom in FIG. 4c, at said pivot causing a rise of the center of gravity of the entire rotor. The rotor falls around, turning upon said bearings. Said warmed working strips, now being upper strips, cool while the present lower strips warm and contract. The process of warming and cooling continues with the result that the rotor turns to provide mechanical energy available for use.

An alternate functioning of the embodiment displayed in FIG. 4 substitutes bouyant force for the force of gravity. Disk 1 is constructed of a bouyant material such as styrofoam and the rotor is immersed about half way. The upper working strips 4 are warmed instead of the lower strips. In this functioning work is done against the bouyant force instead of gravity and the bouyant force returns work done against it as torque. This functioning has the advantage of an available liquid coolant and is especially well adaptable for propelling boats.

All parts in FIG. 2, except the working strips 4, can have a wide variety of material construction, but a model construction used styrofoam for disk 1, wood for axle parts 2, 3, nylon for support disk 5, sewing needle shaft for pivot extension 6, and PVC plastic for bearing surfaces 7.

From the foregoing, it will be appreciated that the objects of the present invention are fully accomplished. As a toy model or demonstration device the present invention dramatically and usefully displays the availability of mechanical energy converted from radiation energy.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A method of converting heat energy to mechanical energy comprising:
   elongating a synthetic polymer until the molecules are highly aligned in the direction of elongation;
   attaching said elongated synthetic polymer to a load;
   heating said synthetic polymer to produce contracting along the direction parallel to the aligned molecules;
   cooling said synthetic polymer to allow it to expand to its original configuration, whereby successive heating and cooling of said synthetic polymer produces work.

2. The method of claim 1 wherein said synthetic polymer is cut into strips prior to elongating.

3. The method of claim 2 wherein, said load is a bending arm having two sections joined by an elastic member;

each end of at least one strip is attached to said bending arm on either side of said elastic member;

whereby successive heating and cooling of said synthetic polymer strips causes said arm to flex.

4. An apparatus for converting heat energy to mechanical energy comprising:

a load;

synthetic polymer means attached to said load;

said synthetic polymer being an elongated polymer with highly aligned molecules;

heat means for heating said synthetic polymer;

whereby said polymer contracts when heated and relaxes when cooled, thereby doing work against such load.

5. Apparatus according to claim 4 wherein said load comprises:

an axle having its ends supported on bearings;

a weight on said axle;

mounting means mounting said weight for displacement about said axle;

said synthetic polymer being attached to said weight whereby heating of said polymer causes displacement of said weight, resulting in rotating of said axle.

6. Apparatus according to claim 4 wherein said load comprises:

a bending arm having a flexible joint;

said polymer being at least one strip connected to said arm on opposite sides of said joint, whereby heating of said polymer causes said arm to flex.

7. Apparatus according to claim 4 wherein said synthetic polymer comprises a plurality of strips attached to said load whereby when some of said strips are being heated other of said strips are losing heat.

8. Apparatus according to claim 4 wherein said means for heating said polymer comprises exposing said polymer to solar energy.

9. Apparatus according to claim 4 wherein said polymer is comprised of a plurality of strips of elongated polyethelene.

10. Apparatus according to claim 4 including:

pigmenting means for pigmenting said polymer to increase heat absorption.

* * * * *